United States Patent [19]

Iwagami et al.

[11] Patent Number: 4,901,094

[45] Date of Patent: Feb. 13, 1990

[54] WASTE COLLECTING DEVICE OF AN INK JET PRINTER

[75] Inventors: Fusao Iwagami, Nara; Sei Murayama, Yamatokoriyama, both of Japan

[73] Assignee: Sharp Kabushiki Kaisha, Osaka, Japan

[21] Appl. No.: 202,495

[22] Filed: Jun. 7, 1988

[30] Foreign Application Priority Data

Sep. 6, 1987 [JP] Japan ................................. 62-89121
Sep. 6, 1987 [JP] Japan ................................. 62-89122

[51] Int. Cl.[4] ............................ G01D 15/6; B41J 3/04
[52] U.S. Cl. ................................................. 346/140 R
[58] Field of Search .......................................... 346/140

[56] References Cited

U.S. PATENT DOCUMENTS 4,524,365 6/1985 Kakeno .......................... 346/140 X
4,734,718 3/1988 Iwagami ............................ 346/140

FOREIGN PATENT DOCUMENTS 3612299 10/1986 Fed. Rep. of Germany .
217159 10/1985 Japan .

*Primary Examiner*—Joseph W. Hartary
*Attorney, Agent, or Firm*—Birch, Stewart, Kolasch & Birch

[57] ABSTRACT

An ink jet printer is equipped with a cap for covering a nozzle face to prevent the nozzle from clogging and has maintenance solution supplied to the cap. A waste collecting device is provided in the printer and includes a powder type absorbent placed in a waste collecting tank case so that waste liquid such as maintenance solution and ink led from the cap into the tank case is absorbed by and retained in the powder absorbent.

3 Claims, 6 Drawing Sheets

FIG. 4
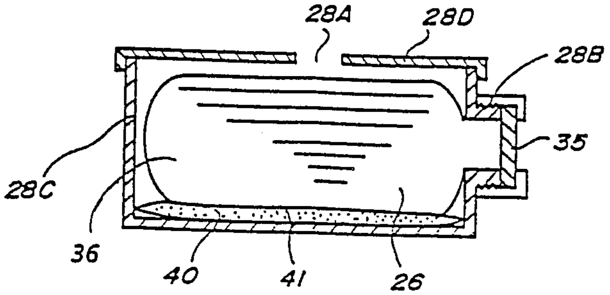
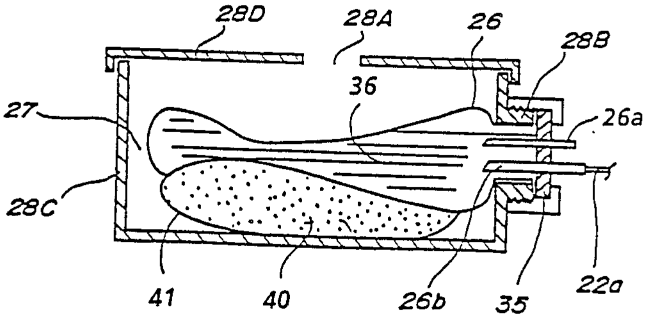
FIG. 5

WASTE COLLECTING DEVICE OF AN INK JET PRINTER

BACKGROUND OF THE INVENTION

The present invention relates to an ink jet printer which sprays ink through the nozzle onto a paper for printing according to printing signals, or more specifically to an ink jet printer which is equipped with a cap for covering the nozzle face to prevent the nozzle from clogging, the cap being filled with maintenance solution to protect ink in the nozzle from drying and solidifying.

The ink spray nozzle of an ink jet printer is exposed to the atmosphere when the printer is not used. Ink contained in the nozzle therefore dries and solidifies, causing the nozzle to clog. Dryness and solidification of ink can also occur while the printer is transported or stored.

To prevent clogging, the conventional ink jet printer is equipped with a cap member for tightly covering the nozzle face while the printer is turned off or long out of service with power on so that ink in the nozzle may not be dried and solidified.

In the U.S. patent application Ser. No. 849, 791 filed on Apr. 9, 1986 and in the W. German patent application No. P3612299.8 filed on Apr. 11, 1986, the applicant has proposed an ink jet printer in which the cap member is filled with maintenance solution composed of solvent such an antimold agent or water so that ink in the nozzle does not dry and solidify when the printer is long out of service. According to this proposed application, the maintenance solution in the cap member is collected in a waste tank when a printing operation is started. The waste tank contains a water-absorbing polymer which absorbs the collected maintenance solution to become a gel.

FIG. 11 shows the proposed conventional device. As shown, a tank 128 has a waste collecting port 128A in the top wall and a joint port 128B in a side wall for supplying maintenance solution from a maintenance solution tank 126.

The maintenance solution tank 126 installed in the tank 128 comprises a flexible bag made by blow-molding resin material. The bag has an opening which is closed by a seal rubber 135. The rubber seal 135 is positioned in the joint port 128B.

The space surrounding the maintenance solution tank 126 in the tank 128 serves as a waste collecting section 127. A water-absorbing polymer 136 is placed on the bottom of the waste collecting section 127.

The water-absorbing polymer 136 ("SUPER LOVE" by Asahi Chemical Industry Co., Ltd. may be used.) is capable of absorbing 70cc of electrolyte for each 1 gram of the polymer. If liquid to be absorbed is pure water, the polymer 136 is capable of absorbing it by 700 to 1000 times the weight of the polymer. Absorbing the liquid, the polymer 136 becomes a gel.

However, since the water-absorbing polymer 136 itself is large in volume, it occupies a large space in the tank, leaving a smaller space for waste liquid. Therefore, it is necessary to replace the waste tank 128 frequently.

SUMMARY OF THE INVENTION

In view of the above problem, an object of the present invention is to provide a waste collecting device for an ink jet printer which uses powder type absorbent, enabling a larger volume of waste liquid to be stored in the waste tank.

Another object of the present invention is to provide an ink mist absorbing device for an ink jet printer in which a bag containing powder type absorbent is divided into a plurality of sections so that the powder does not gather in one side of the bag when a cartridge type waste tank is transported.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, the waste collecting device of an ink jet printer of an embodiment of the present invention uses powder type absorbent of small volume to absorb waste liquid.

According to the present invention, since the volume of the absorbent itself is small, the waste tank is allowed to contain a larger amount of waste liquid.

To achieve the above objects, the waste collecting device of an ink jet printer of another embodiment of the present invention comprises a waste-collecting tank case to which waste liquid including maintenance solution and ink is supplied from the cap, and a bag placed in the tank case, the bag being divided into a plurality of sections each containing a powder type absorbent.

According to the present invention, since the bag is divided into a plurality of sections and each section contains a waste powder type absorbent, the absorbent will not gather on one side of the bag.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 is a sectional view of the waste collecting device of FIG. 3;

FIG. 5 shows the state of the waste collecting device of FIG. 4 when it is used;

DETAILED DESCRIPTION OF THE EMBODIMENTS

The present invention is described in detail below with reference to the accompanying drawings.

Figure 1:
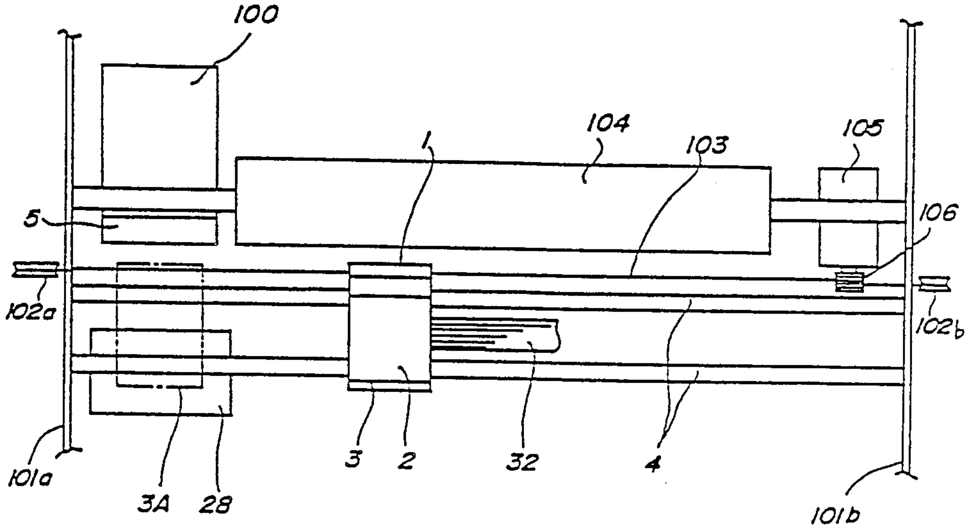
FIG. 1 is a plain view of the printing section of an on demand type ink jet printer related to the present invention.
Figure 2:
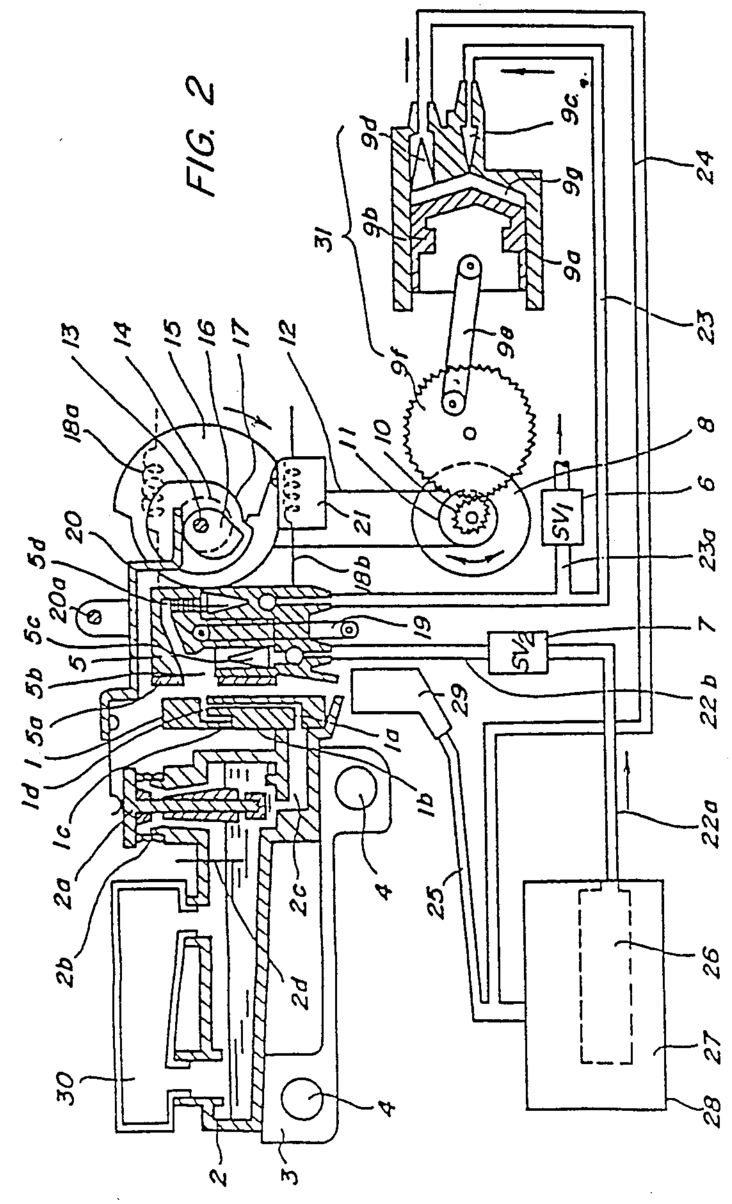
FIG. 2 shows the construction of the nozzle orifice protective apparatus provided in the printer of FIG. 1.

FIG. 1 is a plain view of the printing section of an on-demand type ink jet printer related to the present invention, and FIG. 2 shows the construction of the nozzle orifice protective apparatus provided in the ink jet printer.

Referring to FIG. 1, a platen 104 is rotatably supported by frames 101*a* and 101*b*. A rotary mechanism (not shown) is connected to the platen 104 to control its rotation for paper feeding.

Two slide shafts 4, 4 are mounted in parallel to the platen 104 between the frames 101*a* and 101*b*, and a carriage 3 is slidably supported by the slide shafts 4. The carriage 3 is provided with a wire 103 which is extended around a drum 106 connected to the rotary shaft of a motor 105 and around pulleys 102*a* and 102*b*. Rotation of the motor 105 causes the carriage 3 to reciprocate for printing in the printing zone (travel zone) to the right of the home position 3A when printing is not conducted (standby period).

A printing head 1 having an ink spray nozzle opening (orifice) is mounted on the front of the carriage 3, facing the platen 104. The nozzle opening in the printing head 1 comprises a plurality of orifices. An ink tank 2 is mounted in the rear of the carriage 3 to supply ink to the printing head 1.

A printing signal is sent through a cable 32 to the carriage 3 from a control block. The carriage 3 is placed in the home position 3A when the printer is in the standby mode, when power is not supplied to the printer, or when the printer is transported in a package.

The printer is equipped with a nozzle orifice protective apparatus 100 with a cap member 5 at the position facing the carriage 3 in the home position 3A so as to cover the nozzle of the printing head 1. A tank 28 is provided at the lower part of the home position 3A. The tank 28 contains maintenance solution to be supplied to the nozzle orifice protective apparatus 100 and stores waste liquid returned from the printing head 1 and the apparatus 100.

Construction of the printing head 1 and nozzle orifice protective apparatus 100 is described in detail with reference to FIG. 2.

The carriage 3 includes a gate valve 2*a* for opening or closing an ink passage 2*c* communicating the printing head 1 with the ink tank 2 in the rear of the printing head 1, an ink cartridge 30 for supplying the ink tank 2 with ink, and an electrode 2*d* for detecting the presence of ink in the ink tank 2. The gate valve 2*a* is normally forced by a spring 2*b* to open the ink passage 2*c*. When an external force is applied to the operating shaft of the gate valve 2*a* against the force of the spring 2*b*, the gate valve 2*a* closes the ink passage 2*c*. Specifically, when the portion of the valve 2*a* projected to the exterior is depressed, the valve 2*a* closes the ink passage 2*c*.

The above assembly of the ink cartridge 30, ink tank 2, ink passage 2*c* and gate valve 2*a* is provided independently for each of the nozzle blocks in the printing head 1. In a color ink jet printer, for instance, the printing head may contain nozzle blocks corresponding to yellow, magenta, cyan and black inks, respectively. The above assembly is provided independently for each of these nozzle blocks.

In the printing head 1, ink from each ink passage 2*c* is led through a nozzle capillary 1*a* into an ink chamber 1*b*, and then sprayed through a nozzle orifice 1*d* means of an adjacent piezoelectric element 1*c*.

The specific construction of the nozzle orifice protective apparatus 100 is described now. The cap member 5 for covering the nozzle of the printing head 1 contains a chamber 5*b* with an open front. Rubber or a similar shock-absorbinq seal member 5*a* is provided on the periphery of the opening.

The chamber 5*b* with the opening in the cap member 5 is divided into several blocks corresponding to the nozzle blocks, respectively. A check valve 5*c* is installed in the inlet of the chamber 5*b* through which maintenance solution is supplied to the chamber 5*b*. A check valve 5*d* is installed in the outlet of the chamber 5*b* which communicates with a suction pipe 23 for evacuating the chamber 5*b* to a negative pressure.

The cap member 5 is rotatably supported by a supporting arm 19 which is pivotally supported at its lower end by the frame of the nozzle orifice protective apparatus 100. The cap member 5 is always forced by a pair of springs 18*a* and 18*b* in a direction away from the printing head 1. When the cap member 5 is depressed toward the printing head 1 against the force of the springs 18*a* and 18*b* the cap member 5 rotates around the supporting arm 19 to come to a position for covering the nozzle face of the printing head 1.

The nozzle orifice protective apparatus 100 contains a DC motor 8 as a prime mover. By changing the polarity, the motor 8 rotates in the normal (clockwise) or reverse (counterclockwise) direction.

A vacuum pump 31 is mounted in relation to the motor 8. The vacuum pump 31 comprises a cylinder 9*a*, piston 9*b*, check valves 9*c* and 9*d* piston rod 9*e*, gear 9*f* and pump chamber 9*g*. A gear 10 is connected to the motor 8 to transmit rotation of the motor 8 to the gear 9*f* of the vacuum pump 31.

The inlet and outlet of the vacuum pump 31 are connected with flexible pipes 23 and 24 of synthetic resin, respectively. The other end of the pipe 23 connected to the inlet (suction port) of the pump 31 is connected to the outlet of the chamber 5*b* in the cap member 5. The other end of the pipe 24 connected to the outlet (discharge port) of the pump 31 is connected to a waste collecting section 27 of the tank 28.

A moving mechanism is provided in relation to the DC motor 8 to move the cap member 5.

A pulley 11 which is directly connected to the motor 8 transmits the rotation of the motor 8 to a cam shaft 13 through a belt 12 and a pulley-equipped one way clutch 14. The pulley-equipped one way clutch 14 works to transmit either normal or reverse rotation of the motor 8 to the cam shaft 13 (In the present embodiment, only the clockwise rotation viewed from the front of FIG. 2 is transmitted to the cam shaft 13).

Eccentric cams 15, 16 and 17 are directly connected to the cam shaft 13. The cam 15 works to shift the cap member 5 to the position for tightly covering the nozzle of the printing head 1, the cam 16 to open or close the gate valve 2*a* via a valve lever 20, and the cam 17 to turn on or off a micro switch 21.

The valve lever 20 is rotatably supported at its center by a pivot 20*a* on the frame of the nozzle orifice preventive apparatus 100. An end of the valve lever 20 is made in contact with the circumference of the eccentric cam 16, the other end thereof being positioned on the operating shaft of the gate valve 2*a*. Accordingly, when the cam 16 rotates to actuate the valve lever 20 to turn counterclockwise with the pivot 20*a* as a fulcrum, the other end of the valve lever 20 depresses the operating shaft of the gate valve 2*a* against the force of the spring 2*b*, thus causing the gate valve 2*a* to close the ink passage 2*c*.

The micro switch 21 detects the rotation angle of the cam shaft 13.

The tank 28 comprises a maintenance solution tank 26 containing maintenance solution (made of water or other solvent) 36 and the waste collecting section (waste tank) 27.

A flexible pipe 22*a* is connected to the maintenance solution tank 26. The other end of the pipe 22*a* is connected to a solenoid valve 7 which is connected via a pipe 22*b* to the inlet of the chamber 5*b* in the cap member 5. Therefore, when the solenoid valve 7 opens, maintenance solution 36 is led from the tank 26 through the pipes 22*a* and 22*b* into the chamber 5*b* of the cap member 5.

Waste liquid from the printing head 1 and from the cap member 5 is collected in a gutter 29 and led into the waste tank 27 through a flexible pipe 25. Waste liquid sent through the pipe 24 from the vacuum pump 31 is also led into the waste tank 27.

The suction pipe 23 connected between the cap member 5 and the vacuum pump 31 contains a split pipe 23*a* in the way. The split pipe 23*a* is led to the atmosphere through a solenoid valve 6.

Figure 3:
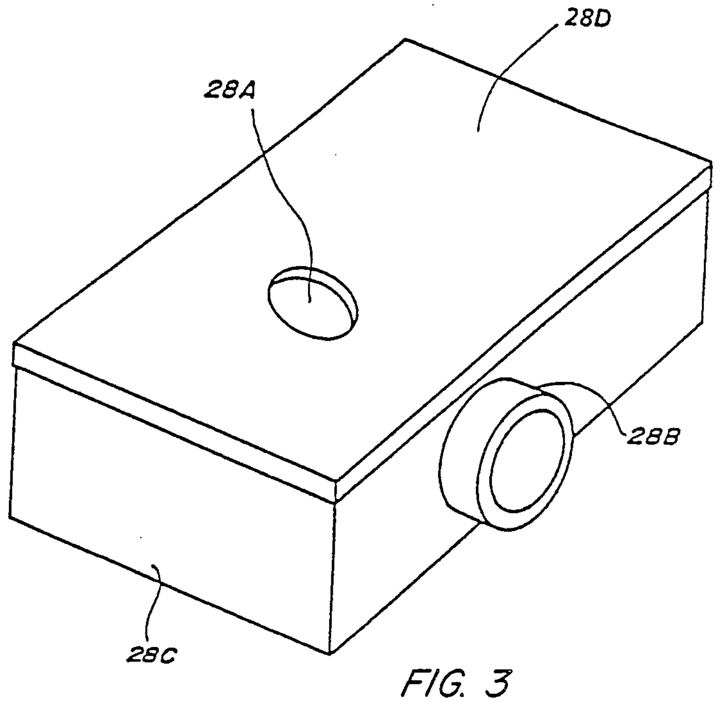
FIG. 3 is a perspective view of the waste collecting device of an embodiment of the present invention, provided in the nozzle orifice protective apparatus of FIG. 2.
Figure 6:
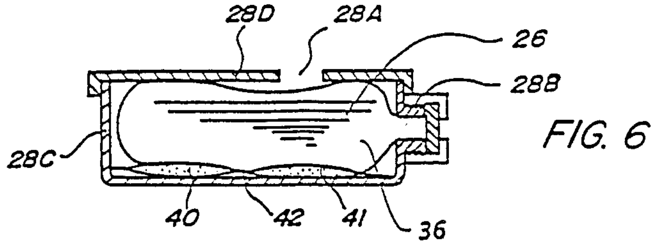
FIG. 6 is a sectional view of the waste collecting device of another embodiment of the present invention.

FIG. 3 is a perspective view of the tank 28, namely, the waste collecting device, and FIG. 4 is a sectional view thereof.

28C is a cartridge body. 28D is a cartridge lid having a waste collecting port 28A therein. 36 is maintenance solution, contained in a flexible bag 26 made by blow-molding, for example, resin (in the present invention, the bag is called a maintenance solution tank). The opening of the bag is closed with a rubber seal 35. A maintenance solution supply tube 26*b* is inserted in the rubber seal 35 so that maintenance solution is supplied from the tank 26. 40 is waste liquid-absorbing agent which is a powder type polymer of small apparent volume. The powder polymer is contained in a bag 41 like a teabag (for instance a bag made of AQUAKEEP 10SH-P- by Seitetsu Kagaku Co., Ltd.). In short, according to the present invention, powder type absorbent contained in a bag 41 is used for absorbing waste liquid. The bag 41 has some elasticity so that the bag 41 expands as the powder absorbent increases in volume by absorbing waste liquid.

When the waste collecting device or the tank 28 is set in the predetermined position in the printer, the end of the pipe 22*a* or namely the maintenance solution supply tube 26*b* enters the maintenance solution tank 26, passing through the rubber seal 35, as shown in FIG. 5, and the waste collecting port 28A faces the pipes 25 and 24.

Thus, the tank 28 is detachable from the printer. Therefore, maintenance solution can be recharged and waste liquid can be disposed simply by replacing the tank 28.

When the tank 28 is set in the printer, sensor electrodes 26*a* and 26*b* are positioned in the maintenance solution tank 26, passing through the rubber seal 35 so that they detect the presence of the maintenance solution in the tank 26. The electrode 26*b* is made of a metal tube and mounted at the end of the pipe 22*a*. Namely, the electrode 26*b* serves as a maintenance solution supply tube through which maintenance solution is sent to the pipe 22*a*. As long as the electrodes 26*a* and 26*b* are in the maintenance solution 36, they are electrically conducting. In other words, when they are not conducting, it means maintenance solution has run out.

The operation of the nozzle orifice protective apparatus shown in FIG. 2 is described in detail below. When the printer is turned off or when the printer is in the standby state with power ON, the nozzle orifice protective apparatus 100 operates as follows.

First, the solenoid valve 6 is actuated to open (SV1: ON) so that atmospheric pressure is achieved in the pipe 23 and pump chamber 9*g*. The motor 8 is actuated to rotate clockwise whereby the cam shaft 13 rotates clockwise due to the function of the one way clutch 14. The rotation of the eccentric cam 16 causes the valve lever 20 to close the gate valve 2*a* in the ink tank 2, so that the ink passage 2*c* is isolated from the ink tank 2. The rotation of the eccentric cam 15 causes the cap member 5 to move toward and tightly cover the printing head 1.

At this stage, the eccentric cam 17 actuates the rotation angle-detecting micro switch 21 ON so that power supply to the motor 8 and to the solenoid valve 6 is shut off. The gate valve 2*a* and the cap member 5 are maintained as they are. Namely, the cap member 5 is kept in close contact with the printing head 1 and atmospheric pressure is achieved in the chamber 5*b* in the cap member 5.

To prevent air from entering the nozzle due to air pressure, the gate valve 2*a* is closed before the printing head 1 is sealed by the cap member 5.

Then the motor 8 is controlled to run counterclockwise. This time, the cam shaft 13 does not rotate due to the function of the one way clutch 14. Therefore, the eccentric cams 15, 16 and 17 maintain their current positions, while the vacuum pump 31 is actuated by the rotation of the gear 10.

Power is supplied to the motor 8 for a predetermined period of time until the pressure in the chamber 5*b* of the cap member 5 and in the pipes 22*b* and 23 reduces to a predetermined value near a vacuum state due to the pump operation. When the predetermined pressure has been reached, the motor 8 is turned off, and power is supplied to the solenoid valve 6 for a short period of time to effect the atmospheric pressure in the pipe 23 and pump chamber 9*g*. This helps prevent maintenance solution from flowing to unnecessary parts in the pipe 23 and pump chamber 9*g* during the next maintenance solution filling process, thus saving maintenance solution.

Then, power is supplied to the solenoid valve 7 for a predetermined period of time to open the valve 7 for the predetermined period. Since the pressure in the pipe 22*b* and chamber 5*b* of the cap member 5 is near vacuum, maintenance solution 36 is sucked from the maintenance solution tank 26 through the pipes 22*a* and 22*b* into the chamber 5*b* of the cap member 5, filling the nozzle orifice. Consequently, ink in the nozzle is prevented from dryness and solidification, air is blocked from entering the nozzle, and the nozzle is protected from contamination.

When a printing operation is started, the nozzle orifice protective apparatus 100 operates as follows.

First, power is supplied to the solenoid valve 6 to open the valve 6 so that the atmospheric pressure is achieved in the pipe 23 and pump chamber 9*g*. With this state, when power is supplied to the motor 8 for clockwise rotation, the cam shaft 13 rotates clockwise. The qate valve 2a which has been closed is opened by the function of the eccentric cam 15, and the cap member 5 is released from the printing head 1 by the function of the eccentric cam 16. At this stage, the micro switch 21 is turned off so that power supply to the motor 8 and to the solenoid valve 6 is shut off.

At this time, waste liquid including maintenance solution, flowing from the chamber 5b of the cap member 5, is collected in the gutter 29 and led through the pipe 25 into the waste collecting tank 27. Thus, the printing head 1 is ready for the printing operation.

As shown in FIG. 5, the maintenance solution tan (bag) 26 contracts gradually as maintenance solution 36 is consumed while waste liquid entering the waste tank 27 through the waste collecting port 28A is absorbed by the absorbent 40. Namely, the maintenance solution tank 26 reduces in volume as maintenance solution 36 is used. In contrast, the absorbent 40 in the elastic bag 41 increases in volume as the amount of waste liquid collected increases.

When the amount of maintenance solution in the tank 26 reduces below a predetermined level, the electrodes 26a and 26b detect the reduced amount.

In the above embodiment, the maintenance solution tank 26 and waste collecting section 27 are located in the same tank 28. Alternatively, they may be located in separate tanks.

Since the maintenance solution tank 26 is made of flexible material, the tank 26 changes in shape and reduces in size as the amount of maintenance solution 36 decreases.

According to the present invention, as mentioned above, the ink jet printer, which is equipped with a cap for covering the nozzle face to prevent clogging and in which maintenance solution is supplied to the cap, has a waste collecting device comprising a powder type absorbent of a small volume disposed in a tank case to which waste liquid such as maintenance solution and ink from the cap is led. Since waste liquid is absorbed by the powder absorbent, the waste tank is capable of containing a larger amount of waste liquid.

Now, another embodiment of the bag 41 containing powder absorbent 40 is described with reference to FIGS. 6 through 10.

Figure 8:
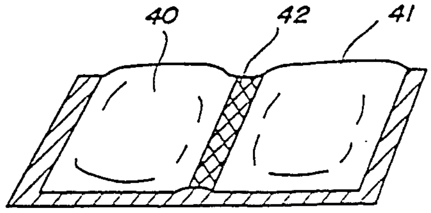
FIG. 8 is a perspective view of a bag which contains a powder type absorbent for absorbing waste liquid.

A powder type polymer of small apparent volume is used as a waste liquid absorbent 40. The absorbent 40 is contained in a bag 41 made of such an elastic material as used for a teabag (say, AQUAKEEP 10SH-P by Seitetsu Kagaku Co., Ltd.). As shown in FIG. 8, both faces the bag 41 are bonded together at a portion 42 to which water soluble adhesive tape (water soluble splicing tape No. 5091SH by Nitto Electric Industrial Co., Ltd. for example) is applied, so that the bag 41 is divided into a plurality of sections.

Figure 7:
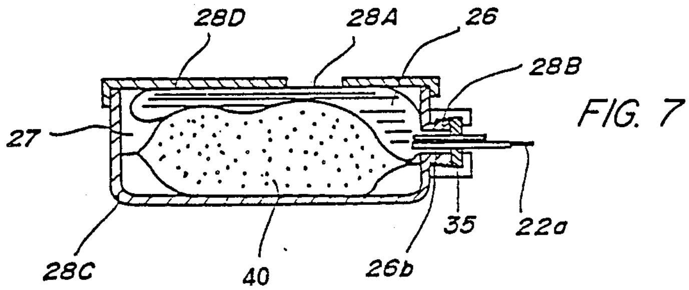
FIG. 7 shows the state of the waste collecting device of FIG. 6 when it is used.

FIG. 7 shows the state of the bag when the absorbent 40 has absorbed waste liquid. Waste liquid absorbed by the absorbent 40 dissolves the water soluble adhesive tape on the bonding portion 42, removing the division of the bag 41. As a result, the powder absorbent 40 expands uniformly in the entire bag 41.

Figure 9:
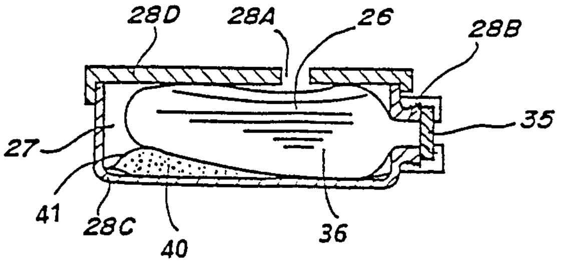
CONVENTIONAL ART FIG. 9
FIGS. 9 and 10 show the states of the bag in which the absorbent gathers on one side.
Figure 10:
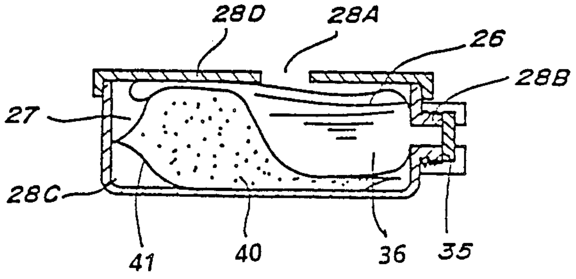
CONVENTIONAL ART FIG. 10
Figure 11:
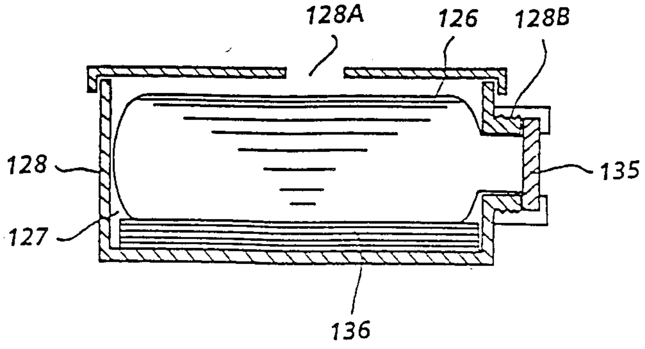
CONVENTIONAL ART FIG. 11
FIG. 11 is a sectional view of the conventional waste collecting device.

In the conventional waste collecting device using powder type absorbent, the powder absorbent tends to gather in one side as shown in FIG. 9 when the cartridge tank is transported. If the absorbent is made to absorb waste liquid as it is, the absorbent will expand in such a state as shown in FIG. 10, hampering the effective use of the full capacity of the waste collecting device. According to the present invention, since the bag 41 is divided into a plurality of sections, the absorbent 40 never gathers in one side, allowing effective use of the capacity of the waste collecting device.

The construction of the bag 41 is not limited to the one shown in FIG. 8. Water soluble adhesive agent or tape may be used for all the covered-bonded portions of the bag 41 so that the covered-bonded portions open when the absorbent expands as it absorbs waste liquid.

According to this embodiment, since the bonding portion 42 is realized by a water soluble adhesive agent or tape, the bag 41 containing absorbent can have a larger capacity when the absorbent which has absorbed waste liquid expands in volume. Accordingly, larger amount of waste liquid can be absorbed.

According to this embodiment of the invention, as described above, the waste collecting device of an ink jet printer which is equipped with a cap for covering the nozzle face to prevent the nozzle from clogging and in which maintenance solution is supplied to the cap comprises a powder type absorbent contained in a bag divided into a plurality of sections, the bag being placed in a tank case to which waste liquid such as maintenance solution and ink from the cap is led, whereby the waste liquid is absorbed by the absorbent. According to this invention, a larger amount of waste liquid can be stored in the waste tank. In addition, since the powder absorbent does not gather in one side of the bag, the capacity of the waste tank can be used more effectively.

While only certain embodiments of the present invention have been described, it will be apparent to those skilled in the art that various changes and modifications may be made therein without departing from the spirit and scope of the present invention as claimed.

What is claimed is:

1. A waste collection device for an ink jet printer, comprising:

an ink cartridge member removably mounted to said printer;

ink supply means provided within said ink cartridge member for supplying ink liquid to said printer;

a waste collecting bag provided within said ink cartridge member and in contact with said ink supply means, said bag being divided into a plurality of discrete sections, each of said plurality of sections containing a powdered material for absorbing fluid;

means for directing waste fluid from said ink jet printer into communication with said waste collecting bag; and means for enabling said waste collecting bag to uniformly absorb said waste fluid within said ink cartridge member upon exhaustion of ink liquid from said ink supply means.

2. The waste collecting device according to claim 1, wherein each of said plurality of sections is joined by a water soluble substance, said waste fluid dissolving the water soluble substance, said water soluble substance thereby preventing shifting of said powdered material within said ink cartridge member prior to absorption of said waste fluid.

3. The waste collecting device according to claim 1, wherein said waste collecting bag is comprised of a flow-through elastic material.

* * * * *